United States Patent
Zozgornik

(10) Patent No.: US 10,883,687 B2
(45) Date of Patent: Jan. 5, 2021

(54) LIGHT CONVERSION DEVICE WITH ANGULAR AND WAVELENGTH SELECTIVE COATING

(71) Applicant: Lumileds LLC, San Jose, CA (US)

(72) Inventor: Steffen Zozgornik, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/470,145

(22) PCT Filed: Dec. 8, 2017

(86) PCT No.: PCT/EP2017/082062
§ 371 (c)(1),
(2) Date: Jun. 14, 2019

(87) PCT Pub. No.: WO2018/108744
PCT Pub. Date: Jun. 21, 2018

(65) Prior Publication Data
US 2019/0390832 A1      Dec. 26, 2019

(30) Foreign Application Priority Data
Dec. 16, 2016 (EP) .................................. 16204587

(51) Int. Cl.
*F21V 21/00*   (2006.01)
*F21S 41/176*   (2018.01)
(Continued)

(52) U.S. Cl.
CPC ............. *F21S 41/176* (2018.01); *F21S 41/16* (2018.01); *F21S 45/47* (2018.01)

(58) Field of Classification Search
CPC ........... F21S 41/176; F21S 41/16; F21S 45/47
(Continued)

(56) References Cited

U.S. PATENT DOCUMENTS 8,598,604 B2    12/2013    Eisert et al.
10,386,629 B2 *  8/2019    Lin ........................... G02B 5/26
(Continued)

FOREIGN PATENT DOCUMENTS

WO    2009095662 A1    8/2009
WO    2013168101 A2    11/2013

OTHER PUBLICATIONS

EPO as ISA, PCT/EP2017/082062 filed Dec. 8, 2017, "International Search Report and Written Opinion", dated Mar. 20, 2018, 13 pages.
(Continued)

*Primary Examiner* — Laura K Tso

(57) ABSTRACT

The invention describes a light conversion device comprising:
a light converter, wherein the light converter is adapted to convert primary light to converted light, wherein a peak emission wavelength of the converted light is in a longer wavelength range than a peak emission wavelength of the primary light,
a reflective structure attached to at least a part of a front surface of the light converter, wherein the front surface defines a light emission surface of the light conversion device, wherein the reflective structure is arranged to reflect a defined part of the converted light, wherein the defined part of the converted light is characterized by a wavelength above a threshold wavelength, and
(Continued)

wherein the light conversion device is arranged to emit at least a part of the defined part of the converted light via the light emission surface such that a color point of light emitted via the light emission surface is shifted to a longer wavelength range than obtained without emission of such part.

The invention further describes a laser-based light source comprising such a light conversion device and a vehicle headlight comprising at least one such laser-based light source.

15 Claims, 4 Drawing Sheets

(51) Int. Cl.
*F21S 41/16* (2018.01)
*F21S 45/47* (2018.01)

(58) Field of Classification Search
USPC .......................................................... 362/510
See application file for complete search history.

(56) References Cited

U.S. PATENT DOCUMENTS

| | | | |
|---|---|---|---|
| 2011/0012141 A1 | 1/2011 | Toquin et al. | |
| 2011/0044046 A1 | 2/2011 | Abu-Ageel | |
| 2011/0317691 A1* | 12/2011 | Kajihara | ............... H04L 49/101 |
| | | | 370/359 |
| 2014/0362557 A1* | 12/2014 | Ulasyuk | .................... F21K 9/64 |
| | | | 362/84 |
| 2015/0124456 A1* | 5/2015 | Hikmet | ................... F21V 13/08 |
| | | | 362/293 |
| 2016/0109096 A1* | 4/2016 | Park | ....................... G02B 5/001 |
| | | | 362/84 |

OTHER PUBLICATIONS

Extended European Search Report dated Jun. 26, 2017, European Application No. 16204587.6, 7 pages.

* cited by examiner

LIGHT CONVERSION DEVICE WITH ANGULAR AND WAVELENGTH SELECTIVE COATING

CROSS-REFERENCE TO RELATED APPLICATIONS

The present application is a § 371 application of International Application No. PCT/EP2017/082062 filed on Dec. 8, 2017 and titled "LIGHT CONVERSION DEVICE WITH ANGULAR AND WAVELENGTH SELECTIVE COATING", which claims the benefit of European Patent Application No. 16204587.6 filed on Dec. 16, 2016. International Application No. PCT/EP2017/082062 and European Patent Application No. 16204587.6 are incorporated herein.

FIELD OF THE INVENTION

The invention relates to a light conversion device and a laser-based light source comprising the light conversion device. The invention further relates to a vehicle headlight comprising the laser-based light source.

BACKGROUND OF THE INVENTION

US20110044046A1 discloses a high brightness phosphor based light source where the phosphor is excited by a laser and a diffractive optical element is used that passes light with a limited cone angle and reflects high-angled light to be used to enhance the brightness of delivered light.

The color of a phosphor (light converter) based white light source is based on the (yellow) emission spectrum of the phosphor and the (blue) spectrum of the pump source. Mixing can only be applied between these two color points. The color point of the phosphor therefore determines the quality of white light emitted by the white light source. Furthermore, thermal properties of the phosphor may limit adaption of the color point of the phosphor.

SUMMARY OF THE INVENTION

It is an object of the present invention to provide a light conversion device enabling color point correction of a light converter comprised by the light conversion device. The invention is described in the independent claims. The dependent claims comprise preferred embodiments.

According to a first aspect a light conversion device is provided. The light conversion device comprises a light converter. The light converter is adapted to convert primary light to converted light, wherein a peak emission wavelength of the converted light is in a longer wavelength range than a peak emission wavelength of the primary light. The light conversion device further comprises a reflective structure attached to at least a part of a front surface of the light converter. The front surface defines a light emission surface of the light conversion device. The reflective structure is arranged to reflect a defined part of the converted light. The defined part of the converted light is characterized by a wavelength above a threshold wavelength. The light conversion device is arranged to emit at least a part of the defined part of the converted light via the light emission surface such that a color point of light emitted via the light emission surface is shifted to a longer wavelength range than obtained without emission of such part.

The color of a light converter based white light source is based on the (yellow) emission spectrum of the phosphor and the (blue) spectrum of the pump source. Mixing can only be applied between these two color points. The color points of some phosphors are too greenish. As well, the thermal behavior of phosphors with better color points are often not as good. In a lot of applications, where a half sphere (dome) is used as an optical element nearby the light converter, only the light emitted into the central part of the half sphere is used for illumination purposes due to the limitations of the further optics used (collimation lenses and reflectors have limited aperture). If a part of the light which is not directly emitted in the central part of the half sphere is reflected back into the phosphor it could be "recycled" to increase the luminous output in the used central part of the half sphere. The part of the spectrum of this light which is reflected back into the phosphor can be used to influence the color point of the light emitted by the light conversion structure. If only the long wavelength (red) part is recycled the color of a, for example, greenish phosphor can be shifted into a more yellow direction in order to improve for example the quality of the white light emitted by such a light source.

The pump source may, for example, be a light emitting diode (LED) or a laser, especially a semiconductor laser emitting light in a first wavelength range. The first wavelength range is preferably in the blue wavelength range. The light converter comprises a light converting material like a yellow garnet phosphor YAG:Ce (e.g. $Y_{(3-0.4)}Gd_{0.4}Al_5O_{12}$:Ce) which is arranged to convert blue light to yellow light. The reflective structure primarily reflects at least part of the long wavelength (e.g. red) part of the converted light back into the light converter. The back reflected longer wavelength part of the converted light gets a second (third, fourth etc.) chance to leave the light converter via the light emission surface. The additional or recycled light at longer wavelengths emitted via the light emission surface shifts the color point of light emitted by the light conversion device to a longer (e.g. more reddish) wavelength range. The reflective properties of the reflective structure may be adapted to the emission spectrum of the pump light source and the light conversion properties of the light converter comprised by the light conversion device.

The defined part of the converted light may enclose an angle of at least a threshold angle with an optical axis perpendicular to the light emission surface.

The wavelength dependent reflectivity of the reflective structure may depend on the angle at which the converted light is received at the reflective structure. Essentially all light which can, depending on the aperture, be received by the downstream optical devices or elements in the lighting applications may pass the reflective structure without reflection such that essentially no light is lost. Light at and above the threshold wavelength enclosing at least the threshold angle with the optical axis, which threshold angle preferably corresponds with the aperture of the optics, is predominantly reflected. Light below the threshold wavelength may predominantly pass the reflective structure even if received at an angle greater than the threshold angle.

The reflective structure may, for example, be arranged such that a reflectivity at the threshold wavelength increases with increasing angle enclosed between the converted light and the optical axis.

The reflectivity of the reflective structure depends in this case on the angle at which the impinging light at a defined wavelength is received at the reflective structure.

The reflective structure may, for example, be arranged such that a reflectivity of converted light within a wavelength range above the threshold wavelength increases faster than the reflectivity at the threshold wavelength.

The reflectivity of the reflective structure depends in this case on the wavelength of the impinging light. The reflectivity increases faster the longer the wavelength of the impinging light is.

The reflective structure may, for example, be arranged such that a reflectivity of converted light within a wavelength range below the threshold wavelength increases slower than the reflectivity at the threshold wavelength.

Light with a wavelength below the threshold wavelength then leaves the light conversion device at angles larger than the threshold angles easier than light at the threshold wavelength. This light does therefore not get a second or further chance to leave the light emission surface within the part of the half sphere which may be used in the downstream lighting system as described above.

The reflective structure may, for example, be arranged to reflect at least 50% at the threshold wavelength, wherein the threshold wavelength is 650 nm and the threshold angle is 60°.

The reflective structure may, for example, comprise a dichroic mirror. A dichroic mirror comprising a multitude of layers with different refractive indices may be used to provide the wavelength or angle dependent reflectivity described above. The reflectivity may be tailored by means of the number of layers, the thickness of the layers and the refractive indices of the layers in order to provide the required reflectivity which depends on the light emitted by the pump light source, the material of the light converter or the geometric arrangement of the pump light with respect to the light converter.

The reflective structure may alternatively be arranged such that at least a part of the converted light is emitted via the front surface of the light converter without traversing the reflective structure.

The reflective structure may, for example, have an opening. The opening may define a window in the light emission surface through which the converted light may leave the light converter without traversing the reflective structure.

The reflective structure may be arranged such that converted light within a wavelength range below the threshold wavelength is reflected with a first reflectivity. The reflective structure is further arranged such that converted light within a wavelength range above the threshold wavelength is reflected with a second reflectivity greater than the first reflectivity.

The first reflectivity may, for example, be smaller than 50%, and wherein the second reflectivity is greater than 50%. The reflective structure may, for example, be a thin metal layer such as a gold layer which is provided on the front surface of the light converter such that there is an opening defining a window as described above. Reflectivity of gold increases with increasing wavelength. The reflectivity of gold is 50% at a wavelength of around 520 nm and increases with increasing wavelength up to a wavelength of at least 1200 nm. Reflectivity of gold at wavelengths below 520 nm decreases to around 32% at 320 nm.

The light conversion device according to any embodiment described above may further comprise a reflector. The reflector may be arranged to reflect a part of the primary light.

The primary light may, for example, be laser light with a laser peak emission wavelength of 450 nm. The reflector may be arranged to reflect around 21% of the blue laser light. The remaining blue laser light is converted to yellow converted light by means of the conversion device which comprises in this case a yellow phosphor garnet (YAG:Ce). This enables the intended ratio of 26% blue laser and 74% yellow converted light taking into account, for example, Stokes losses in the phosphor. The reflector may be arranged at the front surface of the light converter such that the reflected primary light does not enter the light converter. The reflector may alternatively or in addition be arranged at a back surface of the light converter such that the reflected primary light leaves the light converter via the light emission surface.

The light conversion device may further comprise a reflective side structure. The reflective side structure may be arranged to reflect the converted light characterized by a wavelength above the threshold wavelength. The reflective side structure may be arranged to support the reflective structure in order to provide a tailored color point by means of the light conversion device. The reflective side structure may alternatively be arranged to reflect all light within the visible range of the light spectrum in order to limit or decrease optical losses via the side surface(s).

The light conversion device may comprise a scattering structure. The scattering structure is arranged to scatter the defined part of the converted light such that the part of the defined part of the converted light is emitted via the light emission surface.

The scattering structure may support redirection of the part of the converted light such that, for example, the angle of incidence of converted light reflected by the reflective structure with respect to the reflective structure changes such that the defined part of the converted light can leave the light conversion device within the half sphere which may be used in a lighting application. The scattering structure may comprise scattering elements (e.g. particles) in the light converter or scattering layers which may be provided at one or more side surfaces or the back surface of the light converter.

The reflective structure may alternatively or in addition be arranged to diffusely reflect the converted light.

According to a second aspect a laser-based light source is provided.

The laser-based light source comprises:

at least one laser, wherein the at least one laser is adapted to emit laser light, a light conversion device according to any embodiment described above arranged to convert the laser light as described above.

The laser-based light source may comprise two, three, four or more lasers (e.g. in the form of an array) emitting, for example, blue laser light.

The laser-based light source may further comprise a reflector arranged to reflect a part of the laser light such that reflected laser light is emitted from the light emission surface. The part of the defined part of converted light emitted via the light emission surface is arranged to correct a white point of light comprising the reflected laser light and the converted light.

The laser-based light source may further comprise an optical device, wherein an aperture of the optical device defines the threshold angle.

According to a further aspect a vehicle headlight is provided. The vehicle headlight comprises at least one laser-based light source as described above. The vehicle headlight may comprise two, three, four or more laser-based light sources as described above.

The white point of an automotive headlight used for forward lighting is preferably characterized by a correlated color temperature (CCT) of 5700 K, or a v' color point of about 0.48. White light areas are defined in standards. E.g. ANSI C78.377 is a standard for chromaticity specified by the American National Standards Institute. Most automotive headlights use the 5700 K range as described above. Alternatively, it may also be possible to use a color temperature of 6000 K. The vehicle headlight comprising a laser-based light source as described above may support to provide high-quality white light.

It shall be understood that a preferred embodiment of the invention can also be any combination of the dependent claims with the respective independent claim.

Further advantageous embodiments are defined below.

BRIEF DESCRIPTION OF THE DRAWINGS

These and other aspects of the invention will be apparent from and elucidated with reference to the embodiments described hereinafter.

The invention will now be described, by way of example, based on embodiments with reference to the accompanying drawings.

In the drawings:

FIG. 1 shows a principal sketch of a first embodiment of a laser-based light source comprising a first light conversion device.

FIG. 2 shows a principal sketch of a second embodiment of a laser-based light source comprising a second light conversion device.

FIG. 3 shows the angle dependent reflectivity of a dichroic mirror.

FIG. 4 shows a principal sketch of a third embodiment of a laser-based light source comprising a third light conversion device.

In the Figures, like numbers refer to like objects throughout. Objects in the Figures are not necessarily drawn to scale.

DETAILED DESCRIPTION OF EMBODIMENTS

Various embodiments of the invention will now be described by means of the Figures.

Figure 1:
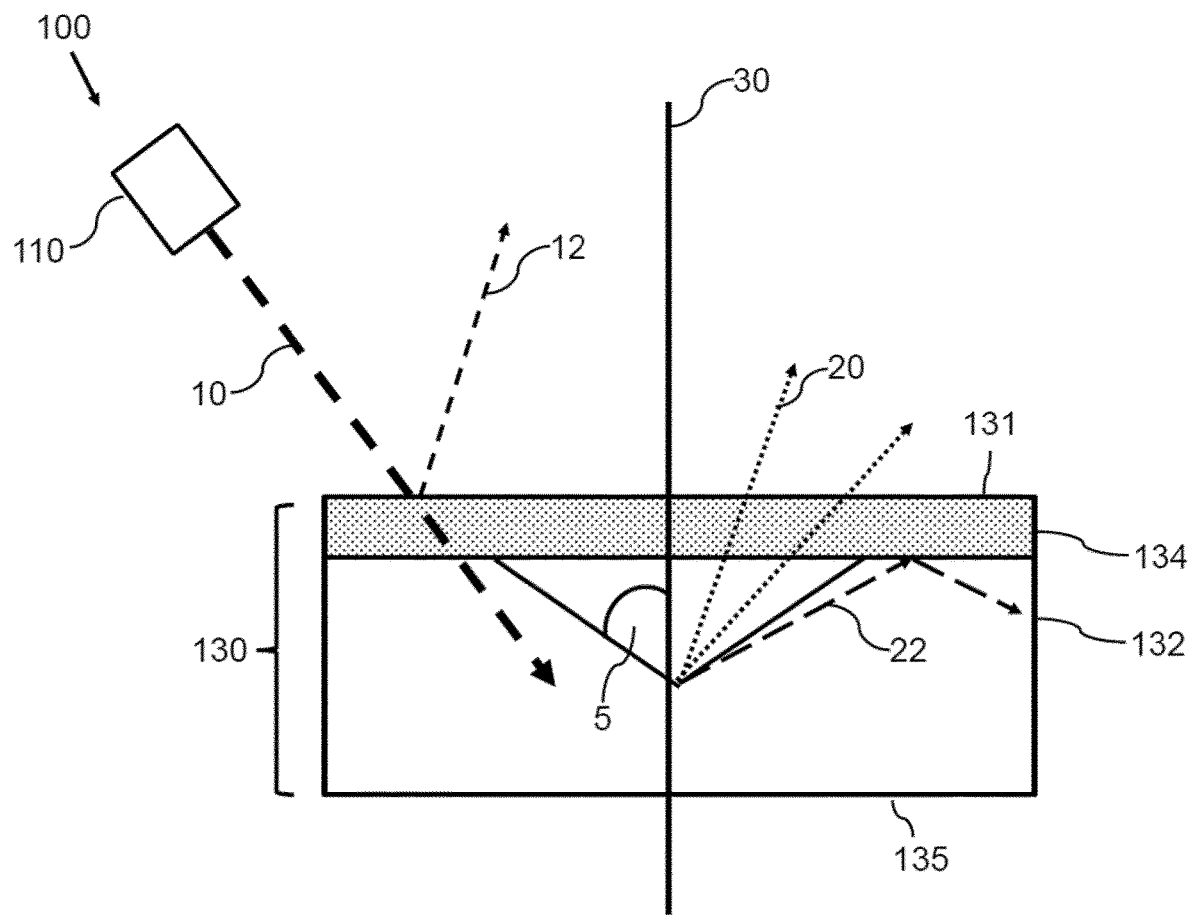

FIG. 1 shows a principal sketch of a first embodiment of a laser-based light source 100 which comprises a laser 110 and a first light conversion device 130. The first light conversion device 130 comprises a light converter 132 with a back surface 135 and a reflective structure 134 attached to a front surface of the light converter 132. The laser 110 emits primary light 10 (blue laser light) to the light converting device 130. A part of the blue laser light is reflected by the reflective structure 134 such that reflected primary light 12 is emitted from a light emission surface 131 of the light conversion device 130. The light emission surface 131 is the outer surface of the reflective structure 134 wherein the other surface of the reflective structure 134 is attached to the front surface of the light converter 132. A part of the blue laser light enters the light converter and is converted to converted light 20. The converted light 20 reaches the reflective structure 134 under various angles. Part of converted light above a threshold wavelength (e.g. above 650 nm) reaches the reflective structure 134 under an angle being larger than a threshold angle 5 (of e.g. 55°) with respect to an optical axis 30 being perpendicular to the light emission surface 131. A substantial part 22 (of e.g. 60%) of converted light above the threshold wavelength reaching the reflective structure 134 at an angle greater than the threshold angle 5 is reflected by the reflective structure 134. A substantial part (e.g. 70%) of converted light 20 below the threshold wavelength impinging on the reflective structure 134 at the same angle traverses the reflective structure 134. Reflected converted light 22 above the threshold wavelength therefore gets a second or further chance to leave the light emission surface 131 within a part of a half sphere (not shown) above the light emission surface 131 defined by the threshold angle 5 around the optical axis 30. The likelihood may be increased by scattering light within the light converter 132 or at one of the surfaces of the light converter 132.

Figure 2:
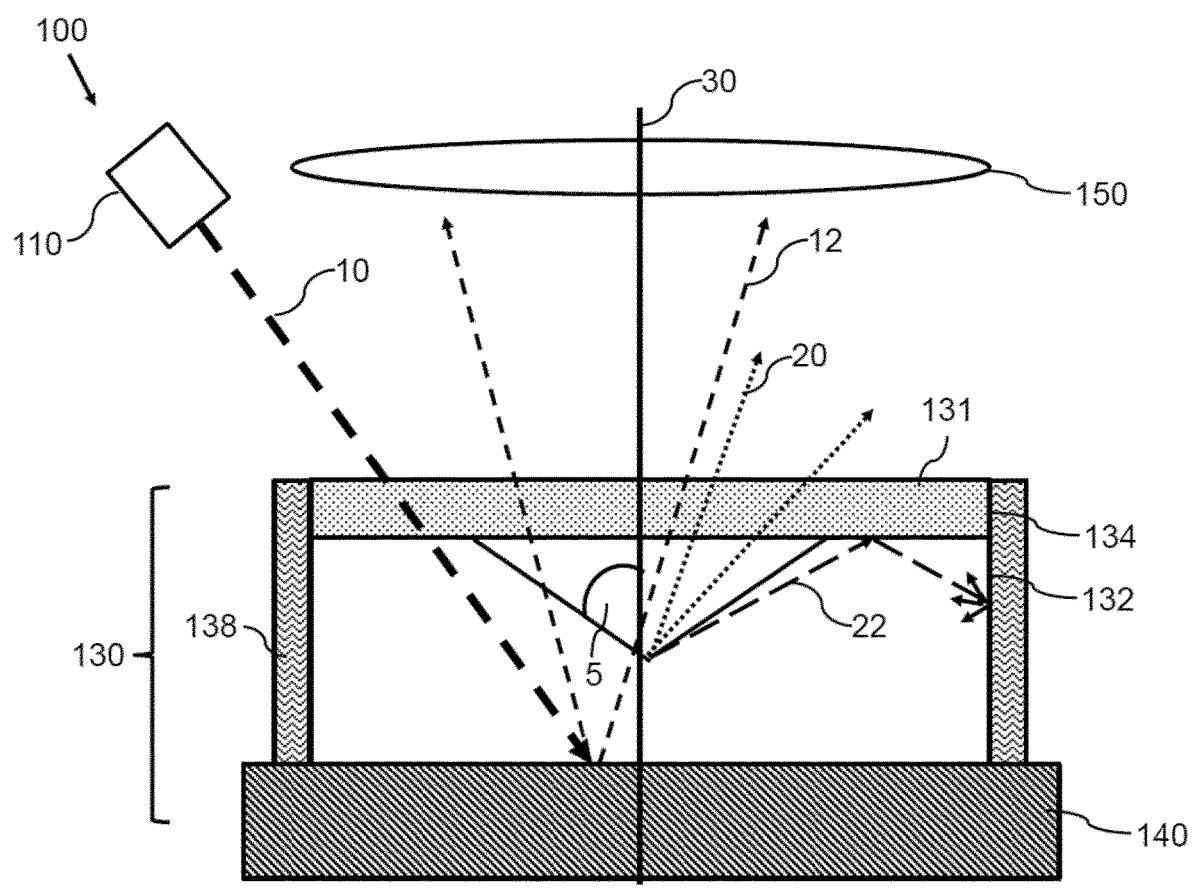

FIG. 2 shows a principal sketch of a second embodiment of a laser-based light source 100 comprising a laser 110 and a second light conversion device 130. The general configuration is very similar to the embodiment discussed with respect to FIG. 1. The reflective structure 134 is in this case a dichroic mirror comprising a stack of thin layers with high and low refractive indices in an alternating order. The reflective structure 134 is essentially transmissive in the wavelength range of the primary light 10. The light conversion device 130 further comprises a heatsink 140 attached to a back surface of the light converter 132 and a reflective side structure 138 attached to a side surface of the light converter 132. The surface of the heatsink 140 attached to the light converter 132 as well as the reflective side structure 138 are arranged to diffusely reflect light within the visible wavelength range. The laser-based light source 100 further comprises an optical device 150, e.g. a converging lens, wherein an optical axis of the optical device 150 coincides with an optical axis 130 perpendicular to a light emission surface 131 of the light conversion device 130. The aperture of the converging lens 150 defines in this case the threshold angle 5. The reflective structure 134 is arranged to reflect converted light 20 above a threshold wavelength as described with respect to FIG. 1.

Figure 3:
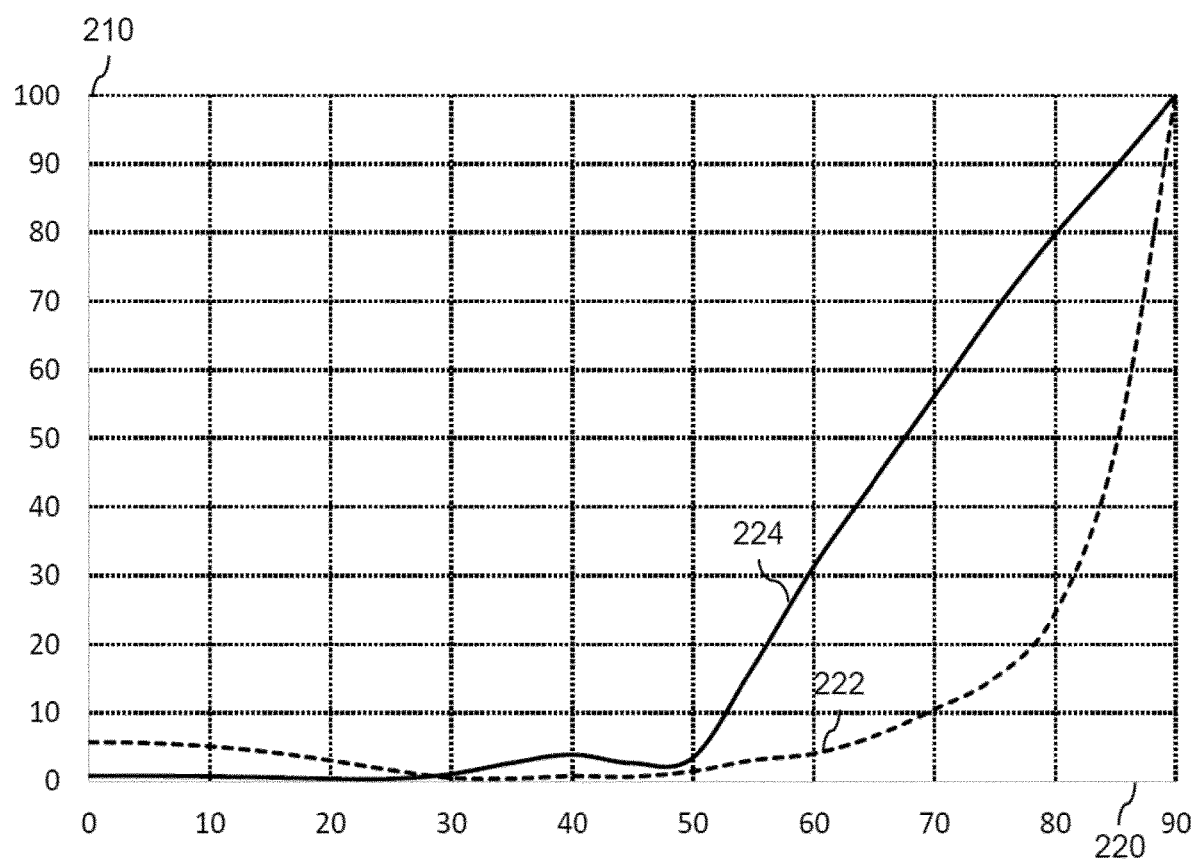

FIG. 3 shows the angle dependent reflectivity of a dichroic or dielectric mirror. The dichroic mirror is a reflective structure 134 as discussed with respect to FIG. 1 or FIG. 2. The ordinate 210 denotes the reflectivity (mean reflectance) and the abscissa 220 the angle to the optical axis 30. Curve 222 shows the mean reflectance at a wavelength of 450 nm. Curve 224 shows the mean reflectance at the wavelength of 630 nm. The reflectivity or mean reflectance at the wavelength of 630 nm is for angles between 50° and 85° substantially higher than the reflectivity or mean reflectance at the wavelength of 450 nm. The dichroic mirror therefore reflects substantially more light at a wavelength of 630 nm back into the light converter 132 such that the recycled longer wavelength light (converted light) can be used to shift the color point of light emitted by the light conversion device 130 to a longer wavelength range. The dichroic mirror comprises in this case a stack of 17 layers comprising thin layers of silicon oxide ($SiO_2$) and niobium oxide ($Nb_2O_5$). The alternating layer sequence is as given in table 1:

TABLE 1

Left column shows the sequence number of the layer, wherein the first layer is attached to the light converter 132; middle column shows the material; and right column shows the thickness of the respective layer

| No | Material | Thickness [nm] |
|---|---|---|
| 1 | SiO2 | 101.4 |
| 2 | Nb2O5 | 119.79 |
| 3 | SiO2 | 203.47 |
| 4 | Nb2O5 | 118.64 |
| 5 | SiO2 | 179.85 |
| 6 | Nb2O5 | 91.88 |
| 7 | SiO2 | 163.14 |

TABLE 1-continued

Left column shows the sequence number
of the layer, wherein the first layer is attached to
the light converter 132; middle column shows
the material; and right column shows
the thickness of the respective layer

| No | Material | Thickness [nm] |
|---|---|---|
| 8 | Nb2O5 | 90.34 |
| 9 | SiO2 | 155.71 |
| 10 | Nb2O5 | 92.12 |
| 11 | SiO2 | 152.19 |
| 12 | Nb2O5 | 91.11 |
| 13 | SiO2 | 156.28 |
| 14 | Nb2O5 | 91.89 |
| 15 | SiO2 | 154.52 |
| 16 | Nb2O5 | 100.78 |
| 17 | SiO2 | 188.55 |

A similar angle dependence to get high reflectivity at longer wavelengths and increasing angle of incidence can be generated by means of a layer sequence of, for example, alternating layers of silicon oxide (SiO$_2$) and titanium oxide (TiO$_2$) with correspondingly adapted layer thicknesses. A multitude of other material combinations can be used in order to manufacture such a multilayer stack. The materials and the thicknesses of the layers may depend on the material of the light converter 132.

Figure 4:
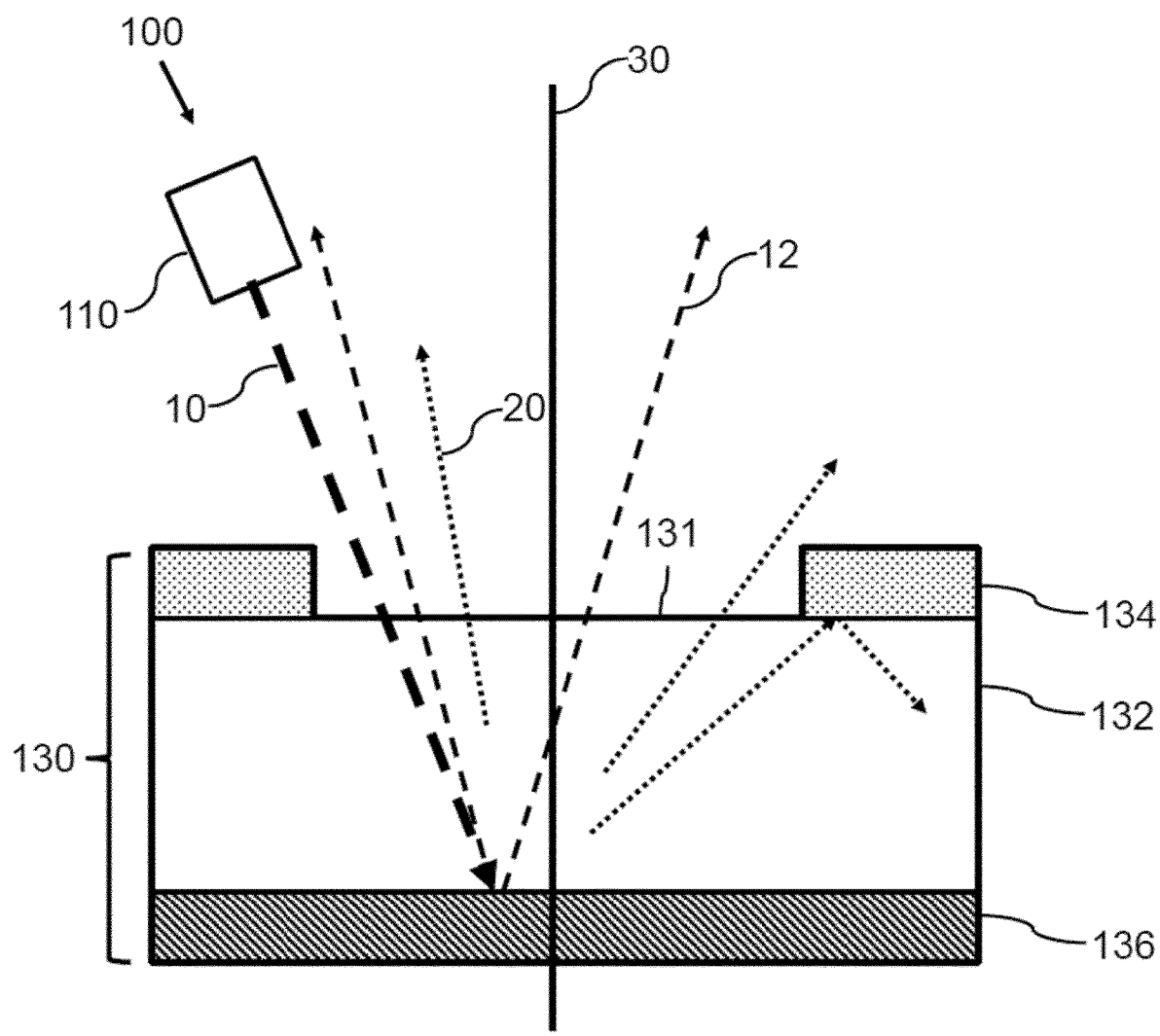

FIG. 4 shows a principal sketch of a third embodiment of a laser-based light source 100 comprising a laser 110 and a third light conversion device 130. The third light conversion device 134 comprises a YAG:Ce light converter 132 with a reflective back structure 136 attached to a back surface of the light converter 132. The third light conversion device 130 further comprises a reflective structure 134 attached to a front surface of the light converter 132. The laser 110 emits primary light 10 (blue laser light) to the light converting device 130. A part of the blue laser light 10 is reflected by the reflective back structure 136 such that reflected primary light 12 is emitted from a light emission surface 131 after traversing the light converter 132. The blue laser light enters the light converter 132 via a front surface of the light converter 132 and is converted to converted (yellow) light 20. The reflective structure 134 comprises a thin gold layer which is attached to a part of the front surface of the light converter 132 such that there is an opening through which converted light 20 and reflected primary light 12 can leave the light converter 132 without interacting with the reflective structure 134. The opening in the reflective structure 134, which may, for example, be a circular opening, defines a light emission surface 131. Converted light 20 above a threshold wavelength (of e.g. 600 nm) reaches the thin gold layer 134 such that more than 90% of this light is reflected back into the light converter 132. Around 65% of converted light 20 below a threshold wavelength of, for example, 500 nm impinging on the reflective structure 134 may be absorbed. Reflected converted 22 light above the threshold wavelength therefore gets a second or further chance to leave the light emission surface 131.

The lasers 110 shown in the figures may be replaced by another pump light source as, for example, an LED. The laser 110 or more generally the pump light source may also be arranged such that primary light 10 is received by the light converter 132 via a side surface or a back surface of the light converter 132. A laser 110 may, for example, be arranged in FIG. 2 such that the primary light 10 emitted by the laser 110 enters the light converter 132 via its back surface (e.g. via a hole in heatsink 140) and a part of the primary light 10 (e.g. blue laser light) may traverse the light converter 132 to be emitted via the reflective structure 134 attached to the front surface of the light converter 132.

While the invention has been illustrated and described in detail in the drawings and the foregoing description, such illustration and description are to be considered illustrative or exemplary and not restrictive.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

LIST OF REFERENCE NUMERALS 5 threshold angle
10 primary light
12 reflected primary light
20 converted light
22 converted light above threshold wavelength
30 optical axis
100 laser-based light source
110 laser
130 light conversion device
131 light emission surface
132 light converter
134 reflective structure
136 reflective back structure
138 reflective side structure
140 heatsink
150 optical device
210 ordinate denoting reflectivity
220 abscissa denoting angle to optical axis 30
222 mean reflectance at 450 nm
224 mean reflectance at 630 nm

The invention claimed is:
1. A light conversion device, comprising:
a light converter, the light converter being adapted to convert primary light to converted light, a peak emission wavelength of the converted light being in a longer wavelength range than a peak emission wavelength of the primary light,
a reflective structure attached to at least a part of a front surface of the light converter, the front surface defining a light emission surface of the light conversion device, the reflective structure being arranged to reflect a defined part of the converted light, the defined part of the converted light having by a wavelength above a threshold wavelength and enclosing an angle of at least a threshold angle with respect to an optical axis perpendicular to the light emission surface, and the light conversion device being arranged to emit at least a part of the defined part of the converted light via the light emission surface such that a color point of light emitted via the light emission surface is shifted to a longer wavelength range than obtained without emission of such part.

2. The light conversion device according to claim 1, wherein the reflective structure comprises a dichroic mirror.

3. The light conversion device according to claim 1, wherein the reflective structure is arranged such that a reflectivity at the threshold wavelength increases with increasing angle enclosed between the converted light and the optical axis.

4. The light conversion device according to claim 3, wherein the reflective structure is arranged such that a reflectivity within a wavelength range above the threshold wavelength increases faster than the reflectivity at the threshold wavelength.

5. The light conversion device according to claim 3, wherein the reflective structure is arranged such that a reflectivity within a wavelength range below the threshold wavelength increases slower than the reflectivity at the threshold wavelength.

6. The light conversion device according to claim 1, wherein the reflective structure is arranged to reflect at least 50% at the threshold wavelength, wherein the threshold wavelength is 650 nm and the threshold angle is 60°.

7. A light conversion device, comprising:
a light converter, the light converter being adapted to convert primary light to converted light, a peak emission wavelength of the converted light being in a longer wavelength range than a peak emission wavelength of the primary light,
a reflective structure attached to at least a part of a front surface of the light converter, the front surface defining a light emission surface of the light conversion device, the reflective structure being arranged to reflect a defined part of the converted light and comprising a dichroic mirror, the defined part of the converted light being characterized by a wavelength above a threshold wavelength, and the light conversion device being arranged to emit at least a part of the defined part of the converted light via the light emission surface such that a color point of light emitted via the light emission surface is shifted to a longer wavelength range than obtained without emission of such part.

8. The light conversion device according to claim 1, wherein the reflective structure is arranged such that at least a part of the converted light is emitted via the front surface of the light converter without traversing the reflective structure.

9. The light conversion device according to claim 8, wherein the reflective structure has an opening, wherein the opening defines a window in the light emission surface through which the converted light can leave the light converter without traversing the reflective structure.

10. The light conversion device according to claim 8, wherein the reflective structure is arranged such that converted light within a wavelength range below the threshold wavelength is reflected with a first reflectivity, and wherein the reflective structure is further arranged such that converted light within a wavelength range above the threshold wavelength is reflected with a second reflectivity greater than the first reflectivity.

11. The light converting device according to claim 10, wherein the first reflectivity is smaller than 50%, and wherein the second reflectivity is greater than 50%.

12. The light conversion device according to claim 1, wherein the light conversion device comprises a scattering structure, the scattering structure being arranged to scatter the defined part of the converted light such that the part of the defined part of the converted light is emitted via the light emission surface.

13. A laser-based light source, comprising:
at least one laser, the at least one laser being adapted to emit the primary light, and
a light conversion device according to claim 1.

14. The laser-based light source according to claim 13 further comprising:
an optical device, wherein an aperture of the optical device defines the threshold angle.

15. A vehicle headlight comprising at least one laser-based light source according to claim 13.

* * * * *